Dec. 14, 1943.   H. J. SCHELHAMMER ET AL   2,336,754
APPARATUS FOR PREPARING PERMEABLE HARD
RUBBER STRIPS FOR VULCANIZATION
Filed Feb. 6, 1941   2 Sheets-Sheet 2
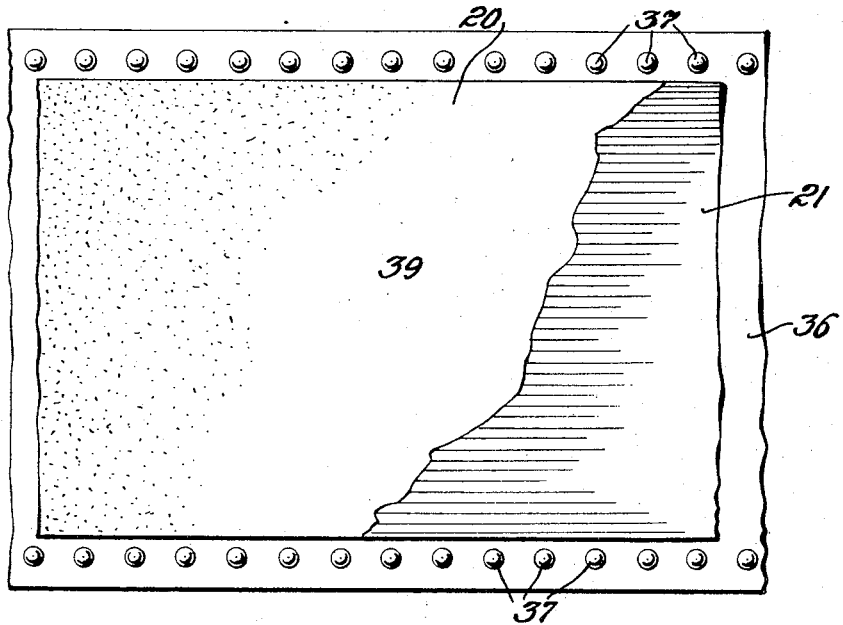
Fig. 3.
Fig. 4.
Fig. 5.
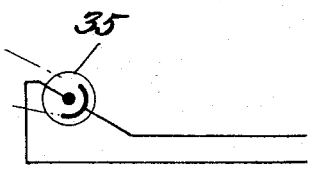
INVENTORS
HERMAN J. SCHELHAMMER
KENNETH E. HUNT
BY
English and Studwell
ATTORNEYS Patented Dec. 14, 1943

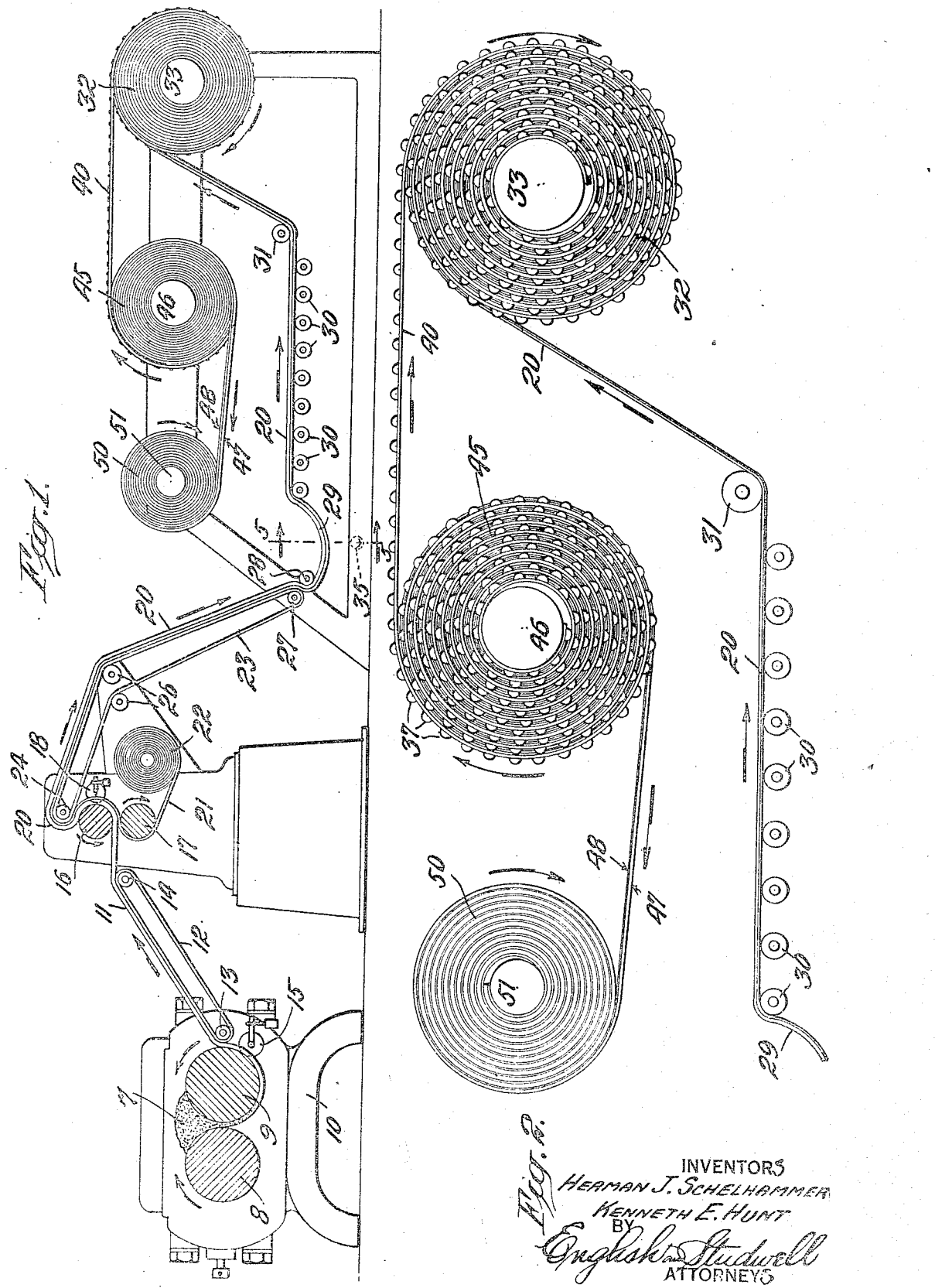

2,336,754

UNITED STATES PATENT OFFICE 2,336,754

APPARATUS FOR PREPARING PERMEABLE HARD RUBBER STRIPS FOR VULCANIZATION

Herman J. Schelhammer, Whitestone, N. Y., and Kenneth E. Hunt, Pequannock, N. J., assignors to American Hard Rubber Company, New York, N. Y., a corporation of New York Application February 6, 1941, Serial No. 377,682

1 Claim. (Cl. 242—55)

The invention relates to an improvement in the production of strips or sheets of permeable hard rubber adapted for use, when in ultimate form, as separators for electrolytic primary or secondary cells, as filter media, or as diaphragms for osmosis and diffusion, and for various other chemical and physical purposes.

It has been proposed heretofore in the production of permeable hard rubber bodies in strip form to wind the uncured hard rubber strip with a backer or liner attached thereto into roll form for vulcanization. In one method the backer or liner for the rubber has been applied directly to the strip of uncured rubber and in another method there has been interposed between the liner and the strip of uncured rubber a layer of clay or the like. But in both cases the rubber strip with its liner has been wound into roll form with the successive coils of rubber and liner directly in contact with each other, that is to say, the upper or uncovered surface of the rubber is in contact with the lower or uncovered surface of the liner. Although this method of preparing the strip of rubber for vulcanization and the vulcanization itself can be successfully practiced, it involves the difficulty of removing the liner from both sides of the strip of vulcanized rubber, and there is question whether the vulcanization is most efficiently performed.

One object of the present invention is to produce an apparatus by which the strip of rubber attached to the liner strip can be so coiled that only one surface of the rubber strip will be in contact with the liner strip, thereby facilitating the removal of the liner from the vulcanized rubber strip. Another object of the invention is the provision of apparatus whereby the strip of uncured rubber can be vulcanized in relatively long lengths in roll form with the same facility and thoroughness as though the ultimate separator plates were vulcanized separately and individually. To these ends the invention consists in the improved apparatus and combination of parts hereinafter fully described and particularly pointed out in the appended claim.

In the accompanying drawings illustrating the preferred form of the invention, Fig. 1 is a side view of apparatus for producing the strip of uncured permeable hard rubber and applying the liner thereto, together with apparatus for winding the rubber-paper strip into roll form so that the successive coils of the rubber-liner strip are held separate from each other, and conveyor means for transporting the rubber-liner strip from the calender to the winding apparatus; Fig. 2 is a side view on an enlarged scale of the winding apparatus; Fig. 3 is a top plan view, on a greatly enlarged scale, of a portion of the strip of metal for separating the rubber-liner strips and showing a portion of the rubber-liner strip thereon; Fig. 4 is a transverse section, on a still greater scale of several coils of the metal separator strip with rubber-liner strips thereon; and Fig. 5 is a diagrammatic view, partly in cross section, taken on the line 5—5 of Fig. 1.

The permeable hard rubber composition may be made up of any preferred ingredients. A mass of the uncured permeable hard rubber composition is indicated at 7 in Fig. 1, resting on the rolls 8 and 9 of a warming mill 10, which delivers a preliminary strip 11 of the permeable hard rubber composition onto the conveyor belt 12 which passes over the rolls 13 and 14. As the preliminary strip of rubber 11 is delivered from the roll 9 onto the conveyor 12 it is trimmed to proper width by cutters 15. The preliminary strip 11 of the porous hard rubber composition is thicker than the finished sheet or strip, and accordingly it is delivered by the conveyor belt 12 to calender rolls 16 and 17 of usual construction and operation. The calender rolls are spaced apart the necessary distance to reduce the preliminary strip of porous hard rubber composition to the web thickness desired in the finished article, usually about .04 inch. It is assumed that the type of separator or filter plate desired is flat or plane on one side and ribbed on the other. Accordingly, the lower calender roll 17 will be smooth, whereas the upper or profile roll 16 will be grooved circumferentially to produce the desired longitudinal ribs on the upper surface of the strip of rubber composition. Since the preliminary strip 9 of rubber composition is squeezed to reduce the strip to the desired thickness, it expands laterally and cutters 18 are provided to trim the strip of rubber composition emerging from the calender rolls to the requisite width.

To the strip of rubber composition passing between the calender rolls, there is applied a strip of unglazed, unstretchable paper 21 which is fed between the calender rolls, passing over the lower calender roll 17 so as to be applied to the smooth under side of the strip of uncured hard rubber composition. The strip of paper unwinds from a roll of paper 22. The strip of paper 21 applied to the smooth surface of the strip of rubber composition acts as a liner or backer therefor, and being squeezed into intimate contact with the strip of rubber composition holds the strip of rubber against distortion prior to and during vulcanization.

The composite strip 20 composed of superposed strips of uncured hard rubber composition and paper is delivered from the upper or profile calender roll 16 onto the forward end of a conveyor 23 which passes over a roll 24 located above the calender roll 16, over idler rolls 26, and over a lower roll 27. As the rubber-paper strip 20 leaves the conveyor 23 at the vicinity of the lower roll 27 it passes under an idler roll 28 and thence in the form of a loop 29 onto a series of conveyor rolls 30, by which it is delivered under an idler roll 31 to the winding apparatus, to be wound up into roll form with alternate coils of the separator strip 36, as indicated diagrammatically at 32 in Fig. 1.

The rubber-paper strip and the separator strip for holding the coils of the rubber-paper strip separate from each other during vulcanization wind up as the roll 32 on a variable speed drum 33. As the rubber-paper strip 20 is delivered in the form of the loop 29 from the conveyor 23 it passes within range of a detector mechanism affected or actuated by the elevation of the loop 29. Various forms of well-known detector mechanisms may be used. The one employed in the arrangement shown in the drawings is a photoelectric eye, indicated diagrammatically at 35. This electric eye, through appropriate mechanism, controls the speed of rotation of the drum 33 in well-known manner. In this connection, it will be understood that as the successive coils of the metal strip and the rubber-paper strip are wound up on the drum 33, the diameter of the roll of coils progressively increases and accordingly the surface speed of the rotating roll of rubber-paper and separating strip proportionately increases, whereas the surface speed of the conveyor 23 is substantially constant. As the surface speed of the roll 32 increases it tends to straighten out the loop 29 of the rubber-paper strip between the delivery end of the conveyor 23 and the receiving end of the conveyor rolls 30, and therefore the loop 29 rises, as indicated diagrammatically at A and B in Fig. 5. This permits more light to reach the electric eye 35 and accordingly, through well-known mechanism, the means for turning the drum 33 slows down the speed of rotation thereof to cause the surface speed of the roll 32 to be reduced to the travel of the conveyor 23.

The means for holding the coils of the roll of rubber-paper strip separate from each other during the curing or vulcanizing operation, just as though each rubber-paper coil occupied its particular vulcanizing chamber with free access of the vulcanizing medium to it, comprises a length of flexible material 36 shown in detail in Figs. 3 and 4, somewhat wider than the rubber-paper strip. Along each margin of one surface of the separating strip 36 is arranged a series of spacing protuberances, shown in the illustrated apparatus in the form of hemispherical rivet heads 37 which in height are somewhat greater than the thickness of the rubber-paper strip, as clearly indicated in Fig. 4. The distance between the rows of protuberances 37 is somewhat greater than the width of the rubber-paper strip. It will thus be understood that when the rubber-paper strip is wound up with the separating strip into successive coils, the paper strip is in contact with the upper surface only of the separator strip, that is to say, in contact with the surface of the separator strip carrying the protuberances 37, and that the bottom of the separator strip, indicated at 38 in Fig. 4, cannot touch the top uncovered surface 39 of the rubber strip. Hence, when the strip of rubber-paper is coiled up with the separating strip 36 into a roll for vulcanization, as indicated at 32 in Fig. 2, the vulcanization of the rubber strip can be accomplished with the rubber in contact with only its paper backer, with the same effect as though only a single coil of the rubber-paper strip were placed in the vulcanizer. The beneficial result is that the permeable rubber strip can expand in thickness at start of vulcanization and obtain its necessary porosity and that when the rubber has been vulcanized and the assembly consisting of the vulcanized rubber strip, the paper strip and the separating strip are removed from the vulcanizer and uncoiled, the vulcanized rubber strip not having been in contact with the separator strip, there is no adherence between them. After the vulcanized rubber strip and the paper strip have been sufficiently dried they may be readily separated.

Several materials may be used for the separator strip, the requirement being that the material when in strip form have not only sufficient flexibility to permit it to be wound into roll form with the rubber-paper strip, but also sufficient rigidity to prevent the unsupported portion of the separator strip extending transversely between the protuberances 37 from sagging and contacting with the uncovered surface of the rubber strip when the rubber-paper strip and the separator strip are coiled up. Materials having the requisite flexibility and rigidity to serve as separator strips are Bakelite, rubberized textile fabrics of heavy "duck" type, closely woven wire and sheet metal. The choice of material for the separator strip will depend on relative cheapness involving original cost and length of service, and efficiency in operation. The most satisfactory material thus far employed we have found to be stainless steel, although it will be understood that the invention is not to be restricted to this material for the separator strip, since the other materials named can be used.

The supply of separating strip 36 in the form of the strand 40 to be wound up with the rubber-paper strip into the roll 32, is furnished from a roll 45 of metal strip mounted on a drum 46 which is constantly driven by drum 33 under friction-brake tension. The roll 45 consists of coils of vulcanized permeable hard rubber strip 47 and its backer strip of paper 48 and coils of the metal strip 36. While the metal separating strip is being unwound from the roll 45 to be wound up as the strand 40 with the uncured permeable hard rubber strip with its paper backer 21 onto the roll 32, the cured permeable hard rubber strip 47 and its backer 48 are being wound up into the roll 50 mounted on the drum 51 which is turned by a friction drive under tension so that the successive coils of cured rubber and paper are tightly wound up into roll form.

The rubber-paper strip delivered from the calender to the winding apparatus is continuous. The length of the flexible metal separator strip with which the rubber-paper strip is wound up into roll form on the drum 33 is such that the completed compound roll of metal separator strip and uncured paper-backed rubber strip can be conveniently handled for placement in and removal from an upright cylindrical vulcanizer of conventional type. When the supply of metal separator strip on the drum 46 has been completely unwound therefrom and wound up on the drum 33, the rubber-paper strip 20 is cut transversely at the end of the metal strip, and then a binding material is wrapped around the roll 32 to prevent the free ends of the metal strip and the rubber-paper strip becoming loosened from the roll. The roll 32 is then placed in the vulcanizer and the rubber strips subjected to vulcanization by live steam or hot water. When the vulcanization step is completed, the roll is removed from the vulcanizer and placed on the drum 46, so that the metal strip may be re-used for winding up with the next strip of uncured rubber and paper and the cured rubber strip wound up into the roll 50. This roll may then be straightened out to permit the rubber and paper to dry, after which the paper is readily removed from the cured rubber and the latter cut up into requisite lengths for its intended purpose.

From the foregoing description it will be recognized that the present invention provides an assemblage of apparatus of novel parts by which the production of permeable hard rubber separator plates or the like may be more expeditiously and efficiently accomplished than by means of apparatus heretofore proposed. By the provision of the spaced-apart coils of the roll of flexible separator strip between which the coils of the rubber-paper strip are confined during the step of vulcanization, all parts of the relatively long strip of rubber composition are freely exposed to the vulcanizing medium as though separately and individually enclosed in a vulcanizing chamber, with the result that the step of vulcanizing the rubber composition with its resulting expansion is most efficiently and expeditiously performed. By means of the arrangement of drawing the supply of separating strip from the compound roll of separating strip and vulcanized rubber strip, for winding into roll form with the uncured rubber-paper strip, while the paper-backed cured rubber strip is being wound up into a roll by itself, a novel arrangement of parts is provided by which strips of permeable hard rubber intended for use as battery box separators, filters or the like, can be produced in quantity relatively cheaply.

Having thus described the invention what we claim as new is:

In an apparatus of the character described, a rotatable drum on which is wound in roll form alternate coils of a flexible metallic separator strip and a vulcanized rubber strip, a second rotatable drum for holding a roll consisting of alternate coils of the flexible separator strip taken from the first drum and an unvulcanized rubber strip, a third rotatable drum for receiving the vulcanized rubber strip taken from the first drum, the separator strip being taken from one side of the first drum while the rubber strip is being taken from the opposite side thereof, and means for feeding an unvulcanized rubber strip to the second drum at the point where the separator strip taken from the first drum is wound up on the second drum.

HERMAN J. SCHELHAMMER.
KENNETH E. HUNT.